3,548,035
SUSPENSION POLYMERIZATION PROCESS
Keitaro Ohe, Kiroyuki Kaneko, and Daijiro Nishio, Kanagawa, Japan, assignors to Fuji Shashin Film Kabushiki Kaisha, Kanagawa, Japan
No Drawing. Filed Feb. 9, 1968, Ser. No. 704,234
Claims priority, application Japan, Feb. 9, 1967, 8,351/67
Int. Cl. C08f 3/66, 7/04, 15/02
U.S. Cl. 260—89.5         9 Claims

ABSTRACT OF THE DISCLOSURE

A process for the suspension polymerization of at least a polymerizable compound having a $CH_2=C<$ group in the presence of a dispersing agent, which comprises conducting said suspension polymerization in the presence of a compound represented by the general formula

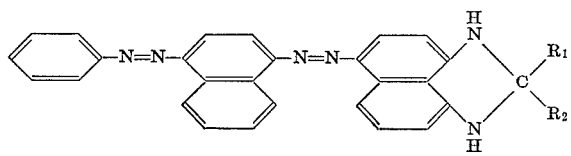

wherein $R_1$ and $R_2$ may be the same or different, and each represents a member selected from the group consisting of a hydrogen atom and a lower alkyl group.

BACKGROUND OF THE INVENTION

Field of the invention

This invention relates to a process for the suspension polymerization of a polymerizable compound having a $CH_2=C<$ group or a composition containing at least one such compound (hereinafter, such a compound is called "monomer" in the specification). More particularly, it is concerned with a suspension polymerization process suitable for producing a fine grained polymer having uniform quality, shape and grain size.

Description of the prior art

Up to the present time, in so-called "suspension polymerization processes" wherein a polymerizable compound having a $CH_2=C<$ group is suspended in water and polymerized, it is known that fine powders of a weakly water-soluble (including insoluble) inorganic salt or a water-soluble high-molecular material may be used as dispersing agents. However, in the case of using fine powders of a weakly water-soluble inorganic salt or a water-soluble high-molecular material alone, as a dispersing agent for suspension polymerization, as above mentioned, it is very difficult to effect the polymerization under stable conditions and to obtain polymer grains having a uniform shape, uniform grain size and narrow grain distribution of small grain size in a high yield.

The inventors have found that suspension polymerization, using the fine powders of a weakly water-soluble inorganic salt or a water soluble high molecular material as a dispersing agent, can be markedly stabilized and a globular polymer of the aforesaid monomer having uniform quality, transparency and narrow grain distribution of very small grain size particles may be readily obtained by adding a certain compound to the polymerization system.

SUMMARY OF THE INVENTION

In accordance with the suspension polymerization process of this invention, suspension polymerization of the foregoing monomers is conducted by adding to the monomer-containing reaction system (hereinafter called "monomer composition") a compound represented by the following general formula:

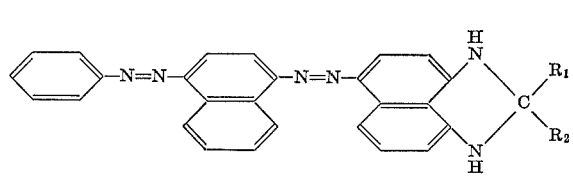

wherein $R_1$ and $R_2$ are hydrogen atoms or a lower alkyl group, and a dispersing agent consisting of the fine powders of a weakly water-soluble inorganic salt, such as calcium phosphate, calcium carbonate, magnesium carbonate, and the like or a water-soluble high molecular weight material, such as, gelatin, dextrin, saponified polyvinyl acetate, sodium polyacrylate, sulfonated polystyrene and the like.

DETAILED DESCRIPTION OF THE INVENTION

The above-mentioned compound is favorably used in a proportion of 0.01–10 parts by weight to 100 parts by weight of the monomer composition, but a proportion of 0.1–1 part by weight to 100 parts by weight of the monomer composition is the most preferable. If too much of the compound is used, the induction period for polymerization is sometimes prolonged. If the compound, being a coloring material, is used in a large amount, the polymer is naturally colored brown, but, in a small amount, it is colored only light yellow. Accordingly, the polymer may be widely used without any trouble except in the case where colorlessness and transparency are required.

Illustrative of the polymerizable compound having a $CH_2=C<$ group, as used in the invention, are styrene, methacrylic acid ester, acrylic acid ester, butadiene, isoprene, acrylonitrile and vinyl acetate. As in the conventional manner, a polymerization initiator, polymerization degree regulator, plasticizer, discoloration inhibitor, light resistance modifier, coloring dye and/or pigment may, of course, be used.

As the weakly water-soluble inorganic salt dispersing agent of the invention there may be used calcium carbonate, magnesium carbonate, basic magnesium carbonate, zinc oxide, cadmium sulfide and calcium orthphosphate. These inorganic salts are preferably used in the form of a fine powder and in a proportion of 0.5–10 parts by weight to 100 parts by weight of the water used. As the water soluble high molecular weight material of the dispersing agents used in the invention, lime-treated gelatin, acid-treated gelatin, starch, dextrin, saponified polyvinyl acetate, sodium polyacrylate and sulfonated polystyrene may be cited as examples. These high molecular materials are preferably used in a proportion of 0.01–10 parts by weight to 100 parts by weight of the water used.

In the process of the invention, water is used in a proportion of 100–1000 parts by weight to 100 parts by weight of the monomer composition, as in the ordinary operation, and, if necessary, a salt such as sodium chloride or sulfate may be added.

The polymer beads or particles prepared by the process of this invention can be used in various fields, for example, as matting agents for papers or synthetic resin films, toners or developers for electrophotography or xerography, fillers or reinforcing agents for pressure-sensitive recording papers, and the like.

The following examples are given in order to illustrate the invention in more detail without limiting the same.

EXAMPLE 1

Polymerization was carried out in a reaction system having the following composition, using a 3000 ml, separable flask equipped with two reciprocating, revolving, stirring blades. Oil Black HRB (the trade name of a material manufactured by Oriented Chemical Co. Ltd. in Japan), was used in this example as the compound represented by the following structure:

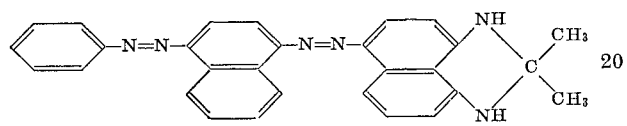

| Test No. | Styrene, g. | Methyl methacrylate, g. | Water, ml. | Sulfonated polystyrene [1] | Oil Black HRB, g. | Benzoyl peroxide g. | Reaction time, hours | Reaction temp, °C. | Polymer yield, percent | Average grain size (grade value) | Distribution value (grade value) |
|---|---|---|---|---|---|---|---|---|---|---|---|
| 1 | 250 | 250 | 2,500 | 3 | 0 | 15 | 3 | 80±1 | 86 | 4.2 | 3.8 |
| 2 | 250 | 250 | 2,500 | 3 | 2.5 | 15 | 4 | 80±1 | 84 | 1.7 | 0.4 |
| 3 | 250 | 250 | 2,500 | 3 | 5 | 15 | 6 | 80±1 | 87 | 1.4 | 0.3 |

[1] Sulfonation degree 93%.

Processing after polymerization was carried out in a manner similar to known suspension polymerization processes, the polymer was filtered, washed adequately with water, and dried. The grain size of the polymer was obtained by photographing a polymerized sample with a scale by double exposure and numbering every value to give an average grain size and distribution value.

Average Grain Size:

$$\bar{b} = \frac{\Sigma a_i b_i}{a_i}$$

Distribution Value:

$$\alpha^2 = \frac{\Sigma (b - b_i)^2 a_i}{a_i}$$

In the foregoing relations, $b_i$ represents a grade value of the following scale and $a_i$ represents a polymer existing in each grade value.

| Grade value $b_i$ | Grain size ($\mu$) |
|---|---|
| 1 | 10 |
| 2 | 10–30 |
| 3 | 30–50 |
| 4 | 50–70 |
| 5 | 70–90 |

It is evident from this experiment that, in the case of effecting polymerization under the same conditions, the additional effect of Oil Black HRB is remarkable and the distribution becomes sharp as the average grain size decreases.

EXAMPLE 2

Polymerization was carried out in a reaction sycstem having the following conditions using the reactor of Exarmple 1.

| Test No. | Methyl methacrylate, g. | Water, ml. | Lime-treated gelatin, g. | Benzoyl peroxide, g. | Oil Black HRB, g. | Reaction temp., C. | Reaction time, hr. | Polymer yield, percent | Average grain size (grade value) | Distribution value (grade value) |
|---|---|---|---|---|---|---|---|---|---|---|
| 4 | 500 | 2,500 | 10 | 15 | 0 | 65±1 | 3 | 80 | 2.1 | 0.9 |
| 5 | 500 | 2,500 | 10 | 15 | 5 | 65±1 | 6 | 76 | 1.6 | 0.5 |

Processing after the polymerization was carried out in a similar to Example 1 and the desired end was achieved.

EXAMPLE 3

Polymerization was carried out in a reaction system under the following conditions in the reactor used in in Example 1.

| Test No. | Styrene, g. | Water, ml. | Basic magnesium carbonate, g. | Benzoyl peroxide, g. | Oil Black HRB, g. | Reaction temp., °C. | Reaction time, hours | Polymer yield, percent | Average grain size (grade value) | Distribution value (grade value) |
|---|---|---|---|---|---|---|---|---|---|---|
| 6 | 500 | 1,500 | 30 | 15 | 0 | 80±1 | 4 | ([1]) | | |
| 7 | 500 | 2,500 | 30 | 15 | 0 | 80±1 | 4 | 92 | 8.5 | 4.3 |
| 8 | 500 | 1,500 | 30 | 15 | 5 | 80±1 | 6 | 93 | 2.0 | 0.8 |

[1] Glutinous.

Processing after polymerization was carried out in a manner similar to Example 1. The thus obtained polymer was filtered, treated with dilute hydrochloric acid to dissolve the inorganic salt, washed adequately with water and dried. A very fine, transparent gained polymer was obtained and the desired end was thus achieved.

What is claimed is:

1. A process for the aqueous suspension polymerization of at least one polymerizable compound selected from the group consisting of styrene, an acrylic ester, a methacrylic ester, butadiene, isoprene, acrylonitrile, vinyl acetate, and mixtures thereof, in the presence of a catalyst and a dispersing agent selected from the group consisting of a weakly water-soluble high molecular weight compound, which comprises conducting said aqueous suspension polymerization in the presence of a compound represented by the general formula:

wherein $R_1$ and $R_2$ may be the same or different, and each represents a member selected from the group consisting of a hydrogen atom and a lower alkyl group, the proportion of said compound being from about 0.1 to about 10 parts by weight per 100 parts by weight of said polymerizable compound.

2. The process as claimed in claim 1 wherein said compound represented by the general formula is:

3. The process of claim 1 wherein said polymerizable compound is styrene.

4. The process of claim 1 wherein said polymerizable compound is a methacrylic ester.

5. The process of claim 1 wherein said catalyst is benzoyl peroxide.

6. The process as claimed in claim 1 wherein said dispersing agent is a weakly water-soluble salt.

7. The process as claimed in claim 6 wherein said salt is selected from the group consisting of calcium carbonate, magnesium carbonate, basic magnesium carbonate, zinc oxide, cadmium sulfate, calcium orthophosphate, and mixtures thereof.

8. The process as claimed in claim 1 wherein said dispersing agent is a water-soluble high molecular compound.

9. The process as claimed in claim 8 wherein said high molecular compound, whereby a fine grained polymer having uniform quality, shape and grain size, is produced is selected from the group consisting of lime-treated gelatin, starch, dextrine, saponified polyvinyl acetate, sodium polyacrylate, sulfonated polystyrene, and mixtures thereof.

References Cited

UNITED STATES PATENTS

| | | | |
|---|---|---|---|
| 2,673,194 | 3/1954 | Grim | 260—93.5W |
| 2,836,585 | 5/1958 | Hill | 260—94.2 |
| 2,932,629 | 4/1960 | Wiley | 260—93.5W |
| 3,054,782 | 9/1962 | Saxon | 260—85.5F |
| 3,243,419 | 3/1966 | Ingram | 260—93.5W |

HARRY WONG, JR., Primary Examiner

U.S. Cl. X.R.

260—82.1, 83.1, 83.5, 84.7, 85.5, 85.7, 86.1, 86.7, 87.1, 88.1, 88.7, 89.1, 93.5, 94.2